United States Patent [19]

Hara et al.

[11] Patent Number: 5,084,719
[45] Date of Patent: Jan. 28, 1992

[54] LENS-FITTED PHOTOGRAPHIC FILM PACKAGE

[75] Inventors: Hiroshi Hara; Hiroshi Ohmura, both of Tokyo; Kazunori Ohno; Junichi Takagi, both of Saitama, all of Japan

[73] Assignee: Fuji Photo Film Co., Ltd., Kanagawa, Japan

[21] Appl. No.: 476,615

[22] Filed: Feb. 7, 1990

[30] Foreign Application Priority Data

Feb. 7, 1989 [JP] Japan .................. 1-13325[U]
Feb. 7, 1989 [JP] Japan .................. 1-13328[U]
Apr. 10, 1989 [JP] Japan .................. 1-41801[U]

[51] Int. Cl.⁵ ............................... G03B 21/22
[52] U.S. Cl. .................... 354/75; 354/150; 354/254; 354/288
[58] Field of Search ............... 354/75, 150, 288, 250, 354/254, 266, 226, 260, 251, 252

[56] References Cited

U.S. PATENT DOCUMENTS

3,446,132  5/1989  Fauth ............................ 354/254
4,057,815  11/1977  Johnson ......................... 354/288
4,772,903  9/1988  Labaziewicz .................... 354/150 X
4,884,087  11/1989  Mochida et al. .................. 354/75

Primary Examiner—L. T. Hix
Assistant Examiner—Howard B. Blankenship
Attorney, Agent, or Firm—Young & Thompson

[57] ABSTRACT

A lens-fitted photographic film package has a talking lens, a shutter and a film advancing mechanism incorporated therein and is loaded with film. The taking lens is disposed at the upper side of a casing of the film package and a first mirror is disposed behind the taking lens. A second mirror is disposed below the taking lens inside the casing. A Z-shaped exposure light path is thus formed by the first and second mirrors. On the inner wall surface of an exposure chamber for conducting the exposure light, there are formed a number of ridges extending in a direction parallel to the path of travel of the exposure light which reduce internal reflection within the exposure chamber. The mirrors are pressed by respective mirror hold-down members from the outside against respective mirror frames, and the mirror hold-down members are shaded with respective shading covers from ambient light.

18 Claims, 7 Drawing Sheets

LENS-FITTED PHOTOGRAPHIC FILM PACKAGE

BACKGROUND OF THE INVENTION

The present invention relates to a lens-fitted photographic film package having an exposure system, and more particularly to a lens-fitted photographic film package having a Z-shaped and elongated optical path.

In order to make it possible for anyone who does not carry a conventional camera to enjoy photographing with ease, various lens-fitted photographic film packages, which are disposable single-use cameras employing a conventional 35 mm film, are now on the market. Such a lens-fitted photographic film package (hereinafter referred to as a film package) has a light-tight casing which is factory-loaded with a 35 mm film. Because the taking lens of the film package is a fixed-focus lens, the user can take pictures only by depressing a shutter release button while aiming at a subject through a viewfinder formed in the film package. After the exposure of a frame, a film advancing wheel is rotated to wind the exposed frame into a cartridge. When substantially the entire length of the film strip is exposed and wound into the cartridge, the film package containing the exposed film is forwarded to a photofinisher without the need to perform a cumbersome rewinding operation. The photofinisher disassembles the light-tight casing or removes a cover member for a cartridge chamber to take out the cartridge containing the exposed film, which is then processed to make prints in a conventional manner. The obtained prints and the negative film are returned to the customer, and the casing is discarded. As the film package should resemble as much as possible a conventional photographic film, the film package has to be manufactured at low cost and should be small and light in weight for easy carrying.

Conventional film packages have a taking lens of about 35 mm focal length, and therefore function as a wide angle photographic camera when loaded with a 35 mm film. Accordingly, the size of the image of the main subjects recorded on the film may be smaller than desired by the customer, which may give disappointing results. In order to solve this problem, it would be desirable to use a long focal length taking lens, as in telephotography. But such a long focal length taking lens needs an elongated light path between the taking lens and the exposure station in which the film surface to be exposed is disposed. Such an elongated light path would result in increasing the thickness, namely the length in the axial direction, of the film package. Increasing the volume is incompatible with the above requirement for compactness.

It is well known in the art that light reflected from the inner wall surfaces of an exposure chamber, through which exposure light passes to the film surface, will cause flaring of the photographic image. In order to prevent this internal reflection, the inner wall surfaces of the exposure chamber of conventional film packages are roughened by molding and coated with a flat black paint to absorb light. But such a coating alone does not sufficiently prevent internal reflection in case of a long focal length taking lens, because a long focal length taking lens has a smaller angle of view and hence the light path will lie nearer the inner wall surfaces of the exposure chamber, thereby increasing the stray light that reaches the inner wall surfaces. In conventional reusable cameras such as compact cameras which can be repeatedly loaded with a new film, a velvety layer for absorbing light is provided on the inner wall surface of the exposure chamber by electrostatic fiber implanting. But such electrostatic fiber implanting is too costly for use in film packages which must be cheap.

It is also known in the art to provide on the inner wall surface of the exposure chamber light-cutting lines formed by a plurality of sharp and narrow grooves extending perpendicular to the optical axis. But such light-cutting lines do not sufficiently prevent internal reflection and moreover require an expensive metal mold for their formation.

OBJECTS OF THE INVENTION

The main object of the present invention is to provide a compact film package with telephotographic function at a low cost.

Another object of the present invention is to provide a film package in which the exposure chamber is provided on its inner wall surfaces with inexpensive anti-reflection structure for sufficiently preventing internal reflection.

A further object of the present invention is to provide a film package in which the exposure light path is shaded from harmful external light in a simple manner.

SUMMARY OF THE INVENTION

According to the present invention, the above and other objects and advantages are accomplished in a film package having a casing formed with a film supply chamber for receiving an unexposed film strip and a film take-up chamber into which the exposed film strip is wound, by disposing a long focal length taking lens between the two chambers and at the upper side of the casing, and providing first and second reflection means such as mirrors which are disposed behind and below the taking lens inside the casing, respectively, so as to form an elongated Z-shaped exposure light path.

According to a preferred embodiment of the invention, the exposure chamber is formed on its inner wall surfaces with a number of ridges extending in the axial direction of the exposure light for trapping light reaching the inner wall surfaces so as to prevent internal reflection in the exposure chamber. Furthermore, the two mirrors are pressed at their rear sides against mirror holders with mirror hold-down members having slits. In this embodiment, the mirror hold-down members are covered with shading members for blocking out extraneous light, since extraneous light would otherwise reach the interior of the exposure chamber through the slits and would have a harmful influence on the exposure.

Because the Z-shaped exposure light path is formed by the two mirrors, a long optical path can be obtained without enlarging the volume of the casing of the film package. According to other advantageous features of the present invention, the exposure light path is shielded from extraneous light which would otherwise enter through the slits of the mirror hold-down members, and internal reflection causing flare is prevented by means of the ridges formed in the exposure chamber.

BRIEF DESCRIPTION OF THE DRAWINGS

The above and other objects and features of the present invention will become apparent from the following description of preferred embodiments thereof with reference to the accompanying drawings in which like parts and elements are designated by the same reference numerals throughout the several views of the drawings and wherein.

DETAILED DESCRIPTION OF THE INVENTION

Figure 1:
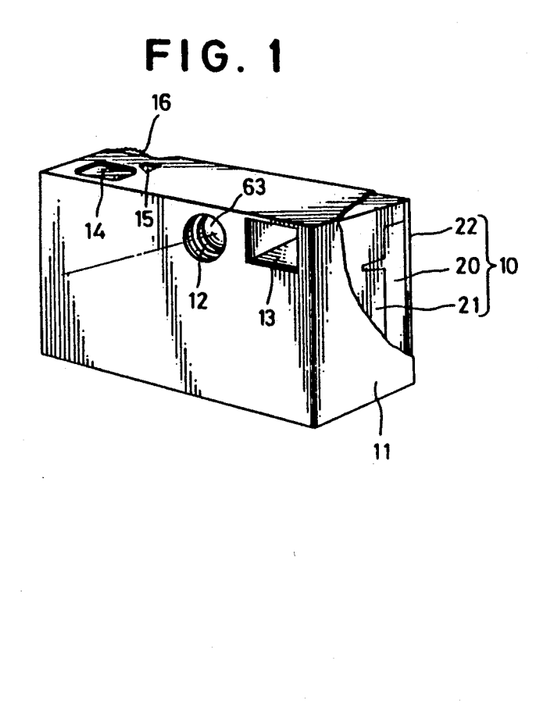
FIG. 1 is a perspective view, partly broken away, of a film package according to a preferred embodiment of the present invention.

Referring to FIG. 1, there is shown a casing 10 of a film package which is factory loaded with a film and in which photographic mechanisms are incorporated. The casing 10 is constructed of a main case body 20 and front and rear covers 21 and 22 which are respectively joined to the front and the rear sides of the main case body 20. Each of these is individually formed as an integral part made of black plastic. Because the casing 10 must be manufactured at low cost, the appearance of the casing 10 is not finished. Therefore, the casing 10 is enclosed in a cardboard box 11 having decorative printing on its outer surface. The customer operates the film package without removing the cardboard box 11 when taking pictures.

The front cover 21 is formed in its upper portion with a lens opening 12 for exposing a taking lens 63 (see FIG. 2) and to the user's left thereof with an objective opening 13 of a simple or direct see-through viewfinder. As the taking lens 63, there is provided a lens system having a long focal length suitable for telephotography, e.g. a focal length of 70-80 mm and an f ratio of 12-14. By positioning the objective opening 13 adjacent the taking lens 63, their optical axes will be approximately parallel so that parallax, namely the difference between the view fields of the see-through viewfinder and the taking lens, can be considerably diminished. The front cover 21 is further formed in its top wall with a shutter button 14 and a frame counter window 15. From the rear cover 22, a film advancing wheel 16 projects rearwardly. In order to make it possible to operate these members without removing the cardboard box 11, the cardboard box 11 is formed with respective openings therefor at appropriate locations.

The film package is factory loaded with film, and after a frame is exposed by depressing the shutter button 14, the film advancing wheel 16 is manually rotated to wind the exposed frame into a film take-up chamber and to pull out an unexposed film strip from a film supply chamber. When substantially the entire length of the film strip is exposed, the film package containing the exposed film is sent to a photofinisher. The photofinisher removes a part of the casing 10 and takes out the exposed film and throws away the casing 10 and the cardboard box 11. The exposed film is processed to make photographic prints.

In the above embodiment of the present invention, the film package is factory loaded with a 35 mm film cartridge and a roll of unexposed film strip which is withdrawn from the cartridge at the factory and inserted into the film supply chamber in a roll whose outermost turn confronts and is in contact with the inner side walls of the film supply chamber. After every exposure, the film strip is rewound by one frame back into the cartridge. Therefore, the film supply chamber is a film roll chamber for receiving a roll of unexposed film strip, while the film take-up chamber is a cartridge chamber. However, it may be possible to employ another film advancing system in which a take-up spool is provided in a film roll chamber and an unexposed film strip is factory prewound from a cartridge onto the take-up spool. Of course other film advancing systems such as employed in a conventional compact camera may be applicable.

Figure 2:
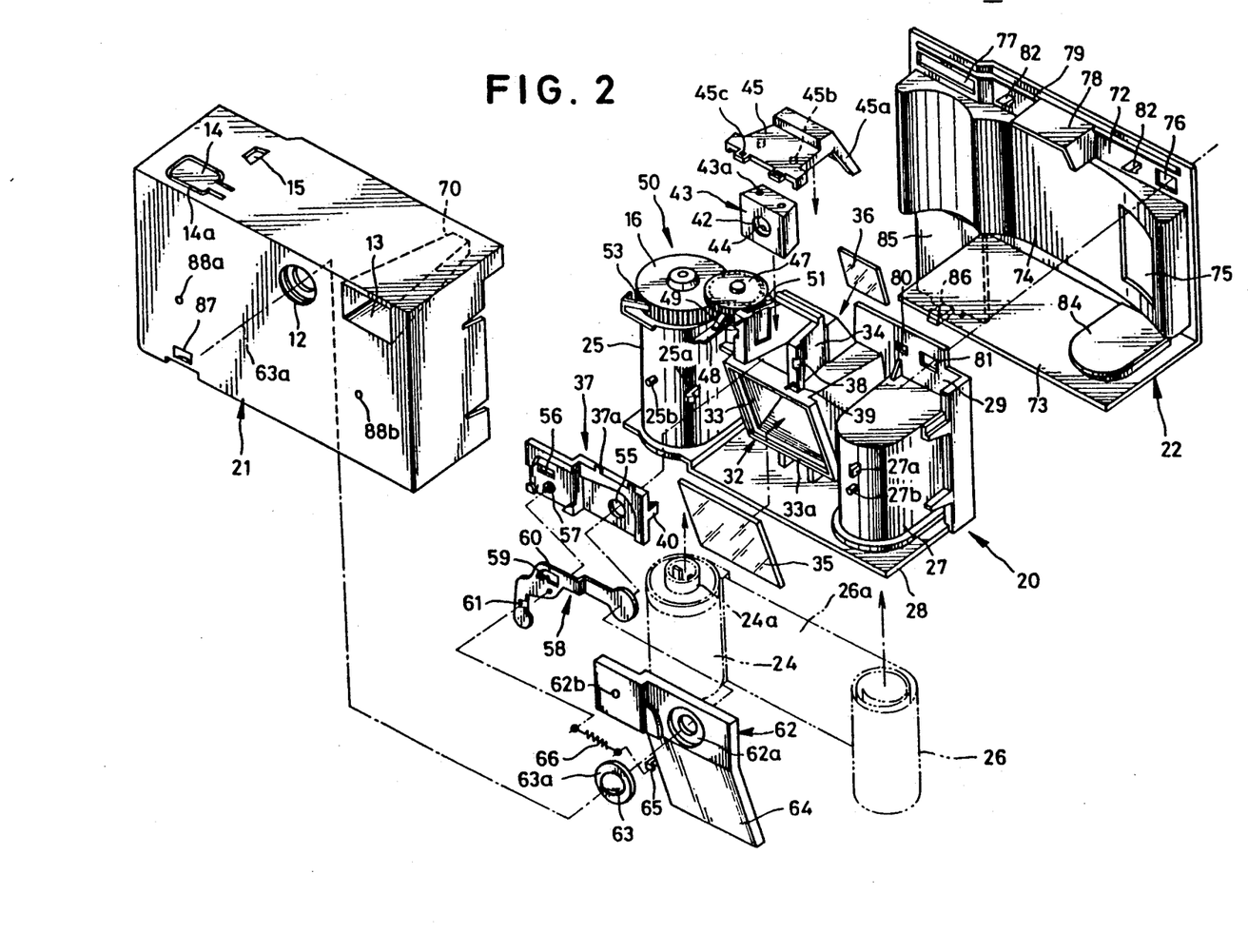
FIG. 2 is an exploded perspective view of the casing of the film package shown in FIG. 1.

The interior of the casing 10 will now be described with reference to FIGS. 2-4. As shown in FIG. 2, the main case body 20 is constructed of a cartridge chamber 25, a film roll chamber 27, a box section 32, back plate 29 and bottom plate 28 which are formed as an integrated component made of black plastic. The cartridge chamber 25 receives a cartridge 24 and the film roll chamber 27 receives a roll of unexposed film 26 which has been previously pulled out from the cartridge 24. The box section 32 is disposed between the cartridge chamber 25 and the film roll chamber 27, and these three sections 25, 27 and 32 are connected with each other through the back plate 27 and the bottom plate 28.

Figure 3:
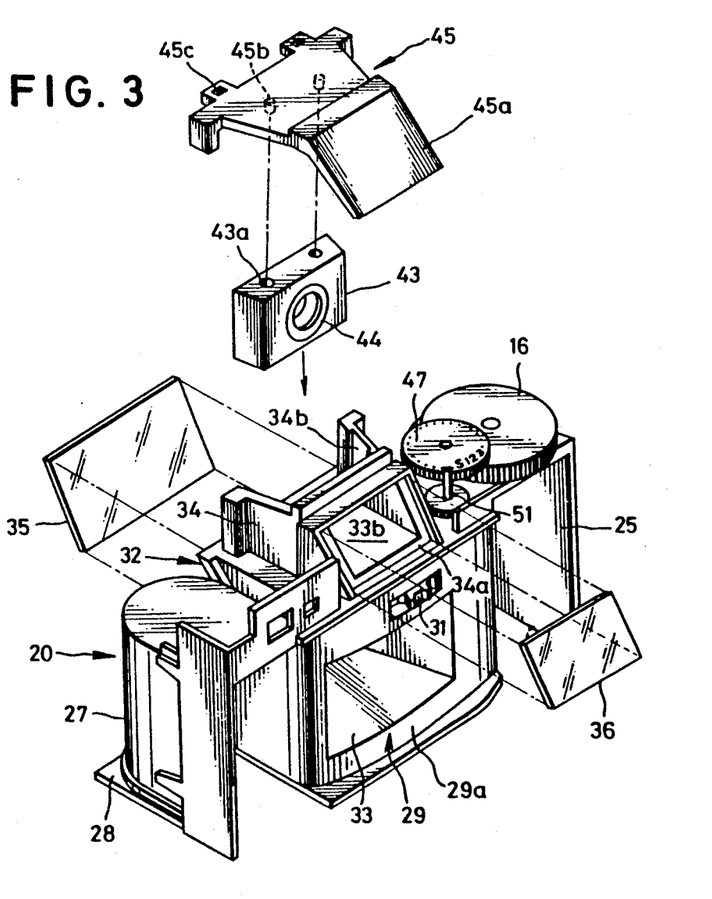
FIG. 3 is an exploded perspective view of a main case body showing the rear side thereof.
Figure 4:
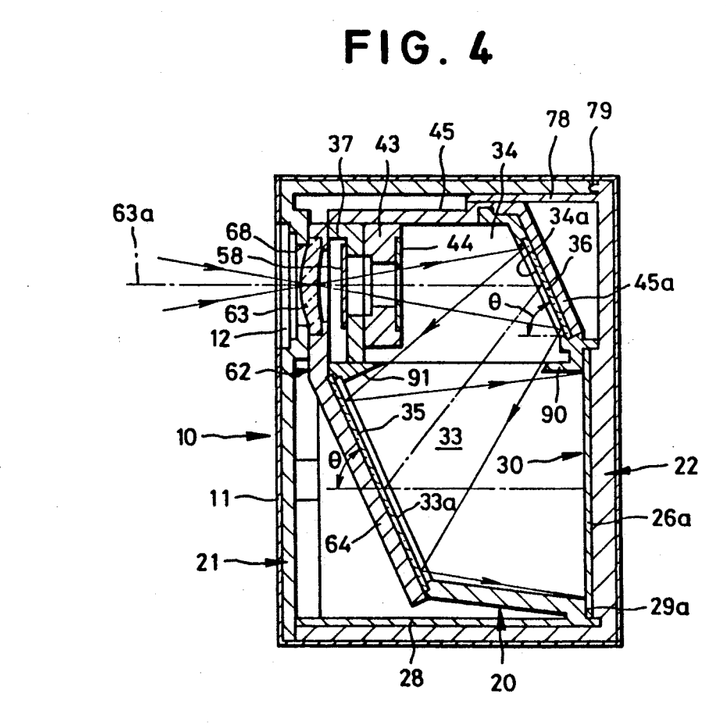
FIG. 4 is a sectional view of the film package shown in FIG. 1.

As shown in FIG. 3, the rear side of the back plate 29 forms a film guide surface 29a which is slightly rearwardly convex so as to diminish the influence of the distortion of the taking lens 63. On the film guide surface 29a is provided a sprocket 31 for advance of the film strip, which is engaged in perforations of the film strip 26a and is rotated by the advance of the film strip 26a.

The box section 32 is formed with a rectangular exposure chamber 33. The rear side of the exposure chamber 33 forms a framing opening, and an exposure station 30 is provided between the framing opening and the rear cover 22. At the front end of the exposure chamber 33, there is formed a mirror frame 33a into which a reflecting member such as a mirror 35 is fitted. The mirror 35 is inclined at an angle $\theta$ and the mirror surface thereof is directed toward the exposure station 30. On the top wall of the exposure chamber 33, there is formed a supporting member 34; and another reflecting member such as a mirror 36 is fitted into a mirror frame 34a formed at the rear end of the supporting member 34. The mirror 36 is smaller than the mirror 35 and is inclined at an angle $\theta$ so as to be parallel to the mirror 35.

The bottom surface of the supporting member 34 or the top wall of the exposure chamber has a rectangular opening 33b through which the light reflected from the mirror 36 in the forward and downward direction passes to the mirror 35. The front and rear side edges of the opening 33b form eaves-like shielding projections 90 and 91 for shielding the exposure station 30 from extraneous light which would cause flares or ghosts.

The taking lens 63 is disposed between the cartridge chamber 25 and the film roll chamber 27 and at the upper side of the main case body 20. The mirror 36 is disposed behind the taking lens 63 and near the rear cover 22, while the mirror 35 is disposed below the taking lens 63 and near the front cover 21. According to the above-described construction, the optical axis 63a of the taking lens 63 is bent by the mirrors 36 and 35 to form a Z-shaped exposure light path the last leg of whose optical axis is substantially perpendicular to the exposure station 30. In this way, by effectively making use of the space within the casing 10, it becomes possible to elongate the exposure light path without increasing the thickness of the casing 10. Furthermore, the exposure station 30 is positioned nearer to the film roll chamber 27 than to the cartridge chamber 25 so that the box section 32 is spaced apart from the cartridge chamber 25, whereby the supporting member 34 will not interfere with a film advancing mechanism 50.

The front side of the supporting member 34 is constructed of two separate walls extending substantially parallel to the optical axis of the taking lens, and a shutter base plate 37 is attached to the front edges of the separating walls by means of a cut-out 38, a projection 39 and a hook 40. But the shutter base plate 37 can be attached by means of screws or adhesives or the like. A diaphragm member 43 formed with an aperture 42 is disposed between the shutter base plate 37 and the mirror 36 and fitted into recessed portions 34b of the separation walls. On the back surface of the diaphragm member 43 is fixedly secured a shading plate 44 by which light entering aslant through the aperture 42 is changed into stray light so as not to lower the contrast of the photographic images.

To assemble this structure, after mounting the diaphragm member 43, a cover 45 is mounted on the supporting member 34 with its pins 45b fitted into holes 43b of the aperture-stop member 43 and with its engaging holes 45c fitted onto projections 37a of the shutter base plate 37. The cover 45 has a mirror hold-down portion 45a for pressing against the mirror 36 from its back side so as to prevent its slipping out and for covering the back side of the mirror 36 so as to shade and protect the same. Since the cover 45 closes a top opening of the supporting member 34 light-tightly, a dark chamber is formed along the light path between the shutter base plate 37 and the exposure station 30.

At the left side of the box section 32, there is provided a film advancing mechanism 50 comprising the film advancing wheel 16, a frame counter disk 47, a shutter drive lever 48, shutter release lever 49 and the like in the same manner as described in Japanese Unexam. Utility Model Publ. 63-115134. The film advancing wheel 16 is positioned over the cartridge chamber 25 and has a fork element integrally formed therewith in a well-known manner. The fork element (not shown) projects into the cartridge chamber 25 and engages with a spool 24a of the cartridge. When the user rotates counterclockwise the film advancing wheel 16 projecting outside the cardboard box 11, the film strip 26a is wound into the cartridge 24 and the sprocket 31 is rotated by the movement of the film strip 26a. Advancing the film strip 26a by the length of one frame rotates the sprocket 31 one revolution, and then a stop claw (not shown) cooperating with the sprocket 31 locks the film advancing wheel 16. Simultaneously, a counter gear 51 makes one revolution to rotate the frame counter disk 47 to its next numbered setting as well as to set the shutter drive lever 48 in the cocked position. A spring plate 53 then stops the rotation of the film advancing wheel 16.

The shutter base plate 37 is formed with a circular aperture 55 and a rectangular opening 56 and a pin 57 is embedded therein on which a shutter blade 58 is pivotally mounted. The shutter blade 58 is formed with an opening 60 having a straight bottom edge and an arresting claw 59 positioned at the middle of the bottom edge and projecting into the opening 60. The arresting claw 59 has the shape of a right-angled triangle whose one edge makes a right angle with the bottom edge. When the shutter drive lever 48 is released from the cocking position, one end of the shutter drive lever 48 is arrested by the arresting claw 59 while moving from the cocking position, thereby pushing the arresting claw 59 clockwise. The shutter blade 58 is thus caused to open the aperture 55 exposing a frame of the film. Immediately after the aperture 55 is fully opened, the arresting claw 59 is disengaged from the one end of the shutter drive lever 48. Thereafter, the shutter blade 58 is urged by a spring 66 connected to projection 61 to return rapidly to the closed position wherein the shutter blade 58 closes the aperture 55. When the shutter drive lever 48 is moved toward the cocking position by rotating the film advancing wheel, the one end of the shutter drive lever 48 passes over the arresting claw 59 while maintaining the shutter blade 58 in the closed position.

A shutter cover 62 is fixed to the shutter base plate 37 with its hole 62b fitted on the tip of the pin 57 to support the shutter blade 58. The shutter cover 62 is formed with a circular recess 62a in which is secured the single element taking lens 63 made of transparent acrylic resin. The shutter cover 62 is further provided with a mirror hold-down portion 64 formed integrally thereon which secures the mirror 35 from slipping out and covers the back surface of the mirror 35 so as to shade and protect the same from ambient light. The other end of spring 66 is secured to a projection 65 formed on the shutter cover 62.

The rim of the lens opening 12 of the front cover 21 presses the margin 63a of the taking lens 63 against the shutter cover 62 to hold the taking lens. Behind the objective opening 13 of the see-through viewfinder is provided a finger barrel 79 which connects the opening 13 to an opening 81 formed in the back plate 29. The shutter release button 14 is provided by cutting a slit 14a in the top wall of the front cover 21. Upon depressing the shutter release button 14, a triangular cam (not shown) disposed directly under the shutter release button 14 pushes the release lever 49 clockwise, thereby to release the shutter drive lever 48. When the front cover 21 is joined to the main case body 20, hooks and pins 25a, 25b and 27a, 27b respectively formed on the outer surfaces of the cartridge chamber 25 and the film roll chamber 27 are engaged with appropriate portions of the front cover 21 or fitted into holes 88a and 88b of the front cover 21, respectively.

The rear cover 22 is constructed of a back plate section 72 and a bottom plate section 73 and is mounted on the rear side of the main case body 20 by means of hooks 82 engaged in holes 80 of the main case body 20, covering teamed with the front cover the main case body 20. The back plate section 72 is formed with a forwardly concave film support surface 74, between which and the film guide surface 29a of the main case body 20 there is formed a film passage for guiding the film strip 26a. Although it is not shown in the drawings, the film support surface 74 is formed with a number of minute projections so as to reduce the area of contact with the film strip 26a and hence to smooth the film advance. The raised portions of the film support surface 74 facing the cartridge chamber 25 and film roll chamber 27 define the positions of the cartridge 24 and the film roll 26, respectively. In the raised area facing the film roll chamber 27, there is formed a recess 75 which contacts the film roll 26 only at its top and bottom ends so as to decrease the resistance upon pulling out the film strip. The back plate section 72 is formed with an opening through which a part of the film advancing wheel 16 projects outwardly, and with a shading cover 78 for covering the mirror hold-down portion 45a so as not to permit external light to enter the exposure station 30 through the mirror hold-down portion 45a. A linear projection 79 is engaged in a groove (not shown) formed at the rear side edge of the top wall of the front cover 21 so as light-tightly to connect the rear side edge with the back plate section 72.

On the bottom plate section 73, there is provided a platform 84 for supporting the film roll 26 received in the film roll chamber 27. The bottom plate section 73 further has a lid 85 with a hook 86 which is engaged with a cut-out 87 of the front cover 21 so as to close the bottom of the cartridge chamber 25. Therefore, by opening the lid 85, the cartridge 24 can be removed from the cartridge chamber 25 after the entire length of the film strip is wound into the cartridge.

The film package of the present invention is assembled in the following manner. First the necessary devices for photographing are mounted on the main case body 20, such as the film advancing mechanism 50, shutter means, mirrors 35 and 36 and the like, and then the front cover 21 is attached to the main case body 20. After loading a film in a dark room, the rear cover 22 is attached to the main case body 20, completing the assembly of the casing 10. The casing 10 is then packed in the cardboard box 11 and enveloped in a bag.

The operation of the above-described embodiment of the present invention will now be described. Rotating the film advancing wheel 16 causes the spool 24a of the cartridge 24 to rotate so that the film strip 26a is pulled out from the film roll 26. When the sprocket 31 is rotated to make one revolution by the advancing movement of the film strip 26a, the first frame is positioned in the exposure station 30 and the film advancing wheel 16 is locked. At the same time, the counter gear 51 causes the frame counter disk 47 to rotate by one pitch to indicate the remaining number of available frames, e.g. "24" within the frame counter window 15. After advancing one frame, the customer frames the scene while viewing it from an opening 76 of the see-through viewfinder.

After framing, the release lever 49 is rotated counterclockwise by depressing the shutter button 14, releasing the locked condition of the shutter drive lever 48 which then rotates rapidly in the counterclockwise direction to strike the arresting claw 59 of the shutter blade 58 so that the shutter blade 58 is rotated by a constant angle in the clockwise direction and thereafter returns to an initial position by means of the spring 66. The shutter blade 58 thus opens and closes the aperture 55 for example at a speed of 1/125 sec. During opening of the aperture 55, the first frame of the film strip 26a positioned in the exposure station 30 is exposed to the light entering through the lens opening 12, the taking lens 63, the diaphragm member 43 and passing along the Z-shaped exposure light path formed by the mirrors 36 and 35 so that the first frame is recorded with an image of the subject.

Upon completing the exposure of the first frame, the locked condition of the film advancing wheel 16 is released to enable operating the same so that the film advancing wheel 16 can be rotated to wind the first frame into the cartridge 24 and the next unexposed frame is pulled from the film roll 26 to be positioned in the exposure station 30. When the second frame is set in the exposure station, the film advancing wheel 16 is locked in the same manner as above, and the next number, e.g. "23" is displayed within the frame counter window 15.

When the last frame, e.g. the 24th frame has been exposed, what little remains of the entire length of the film strip 26a is wound into the cartridge by rotating the film advancing wheel 16, and "E" is displayed in the frame counter window 15 to indicate that the remaining number of available frames is zero. The film package is then forwarded to a photofinisher in order to make prints.

Figure 5:
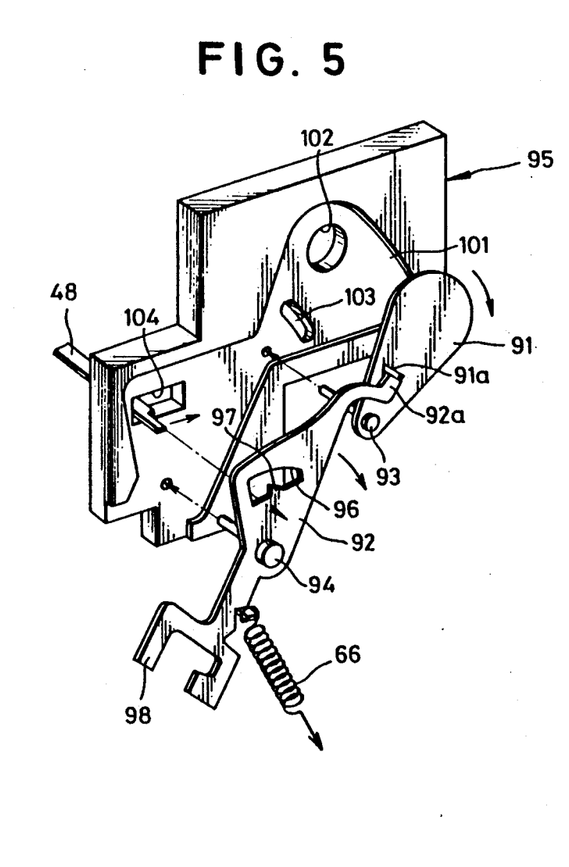
FIG. 5 is an exploded perspective view of another embodiment of a shutter means used in the film package of the present invention.

In general, the shutter speed is required to be constant and stable. In addition, the shutter is required to reach a high shutter speed for telephotography in order to prevent blurring. An embodiment of such a shutter that satisfies the above requirements is shown in FIG. 5. A shutter blade 91 is accommodated in a recess 101 of the shutter base plate 95 and pivotally mounted thereon by an axle 93, and is urged to close an aperture 102 by the spring 66. When rotating in the direction of the arrow against the spring 66, the shutter blade 91 opens the aperture 102. A bent portion 92a of an acceleration lever 92 is inserted into an arcuate opening 103 of the shutter base plate 95 through an opening 91a of the shutter blade 91. The acceleration lever 92 is pivotally mounted on the shutter base plate 95 by an axle 94 and is disposed in the recess 101. The acceleration lever 92 is moved by the shutter drive lever 48 and transmits the motion of the shutter drive lever 48 to the shutter blade 91, thereby speeding up the shutter blade 91 compared with the case wherein the shutter blade 91 is directly moved by the shutter drive lever 48. The free end of the shutter drive lever 48 projects from an opening 104 and is in operational engagement with the acceleration lever 92; namely, that free end is inserted in an opening 96 having an arresting claw 97 with which the free end comes into engagement. In order to stabilize its movement, the acceleration lever 92 is further formed with a balancing portion 98 integral therewith.

Upon the shutter being released, the shutter drive lever 48 is moved in the direction of the arrow, catching on the arresting claw 97. The acceleration lever 92 is then caused to rotate in the direction of the arrow against the force of the spring 66. When the acceleration lever 92 is rotated through a predetermined angle, the free end of the shutter drive lever 48 is disengaged from the arresting claw 97 so that the spring 66 pulls the acceleration lever 92 to swing back rapidly to the initial position. In cooperation with the swinging of the acceleration lever 92, the shutter blade 91 swings to open and close the aperture 102. Upon winding the film strip, the shutter drive lever 48 is moved from the right end to the left end of the opening 104 and, at that time, the free end thereof resiliently slides along the inclined edge of the arresting claw 97 and passes it to return to the initial position at the left end.

In the above embodiment, because the shutter comprises the shutter blade 91 and the acceleration lever 92 instead of the single shutter blade 58 as shown in FIG. 2, the acceleration lever 92 can be balanced in weight and hence can rotate about its axle without overrunning in either direction. Therefore, it becomes possible to stabilize the movement of the shutter blade 91. Furthermore, thanks to the principle of the lever, the swinging motion of the shutter blade 91 is accelerated by means of the acceleration lever 92, depending on the ratio of the distance between the axle 94 and the arresting claw 97 on the one hand, to the distance between the axle 94 and the bent portion 92a on the other hand.

Referring now to FIGS. 6-9, there is shown an embodiment of the present invention wherein the mirrors are fixedly pressed against the mirror frames and thus thoroughly shaded from ambient light. Like parts and elements are designated by the same reference numerals as in the above embodiments. For the purpose of imparting elasticity, the mirror hold-down portion 64 of the shutter cover 62 is bent and made thinner than the remaining portions thereof. The mirror hold-down portion 64 is further formed with two slits 110 to form a pair of tongues 64a so as to increase the elasticity. These tongues 64a are slightly bent toward the mirror 35 and press against the rear side of the mirror 35.

Figure 6:
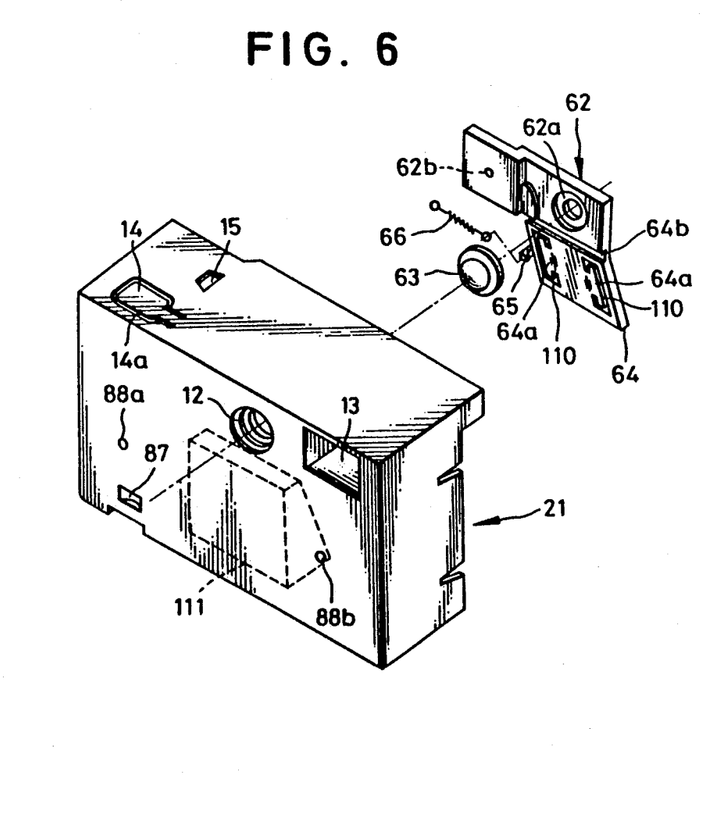
FIG. 6 is an exploded perspective view showing a front cover having a shading cover and a shutter cover according to still another embodiment of the present invention wherein means for shading the exposure chamber light-tightly is provided.
Figure 7:
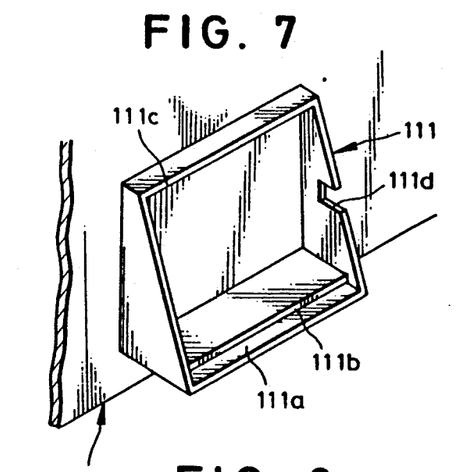
FIG. 7 is an enlarged perspective view of a shading cover shown in FIG. 6.

Because the front cover 21 is formed with the slit 14a for the shutter release button 14, and the holes 88a and 88b and so forth, external light can enter the front cover 21 through these cut-out portions. If the mirror hold-down portion 64 has slits 110, light entering the front cover 21 would pass through the slits 110 into the gap between the mirror 35 and the mirror frame 33a. If this gap connects with the exposure chamber 33, the light would enter the exposure chamber 33 which could result in flares. Accordingly, the front cover 21 is provided at its inner wall with a rearwardly opening box-shaped shading cover 111 formed integrally thereon. The edges of the shading cover 11 slope according to the angle of the mirror hold-down portion 64. The shading cover 111 is formed at its bottom with a lowered area 111a on which the bottom end of the mirror hold-down portion 64 is fitted, whereby a shoulder 111b presses that bottom end against the mirror 35. The top edge 111c of the shading cover 111 is engaged in a groove 64b of the mirror hold-down portion 64. Designated by 111d is a cut-out into which th projection 65 is inserted. It is to be noted that a diaphragm member 113 having front and rear circular apertures is used in this embodiment, and the edges of the apertures are tapered inwardly of the diaphragm member 113, as shown in FIG. 9.

Figure 9:
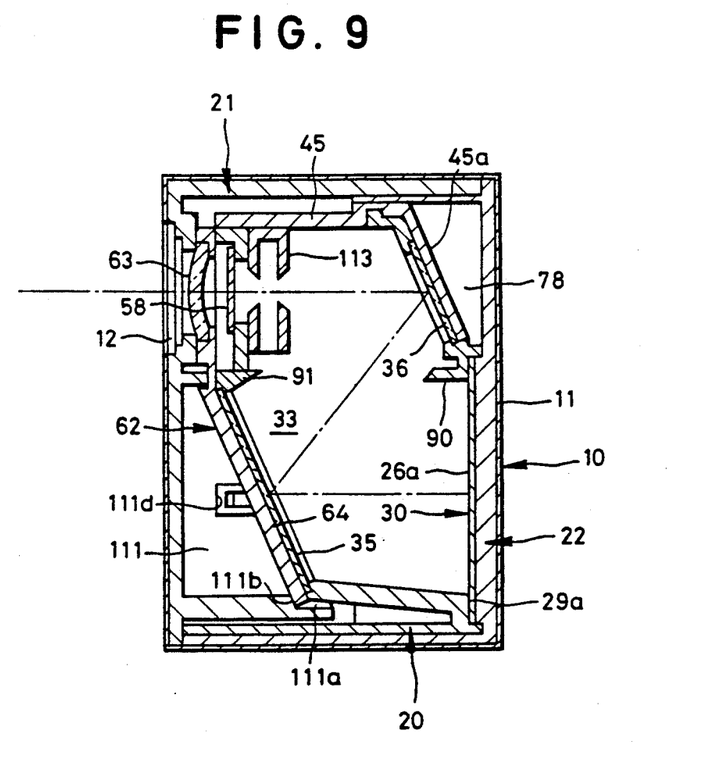
FIG. 9 is a sectional view of a film package according to the embodiment of FIGS. 6-8.

Because the front cover 21 is formed with the shading cover 111 in the above-described manner, the mirror hold-down portion 64 is inserted in and covered by the shading cover 111 when the front cover 21 is attached to the main case body 20 as is shown in FIG. 9. Because at that time the mirror hold-down portion 64 is shaded by the shading cover 111, light entering the front cover 21 is prevented from entering the exposure chamber 33. Light which may leak from the exposure chamber 33 through the slits 110 will be absorbed by the surface of the shading cover 111 because it is made of black plastic. It is possible to form the shading cover 111 the same size as the mirror hold-down portion 64 so that the shoulder 11b of the shading cover 111 can press the edge of the mirror hold-down portion 64 against the mirror 35.

Figure 8:
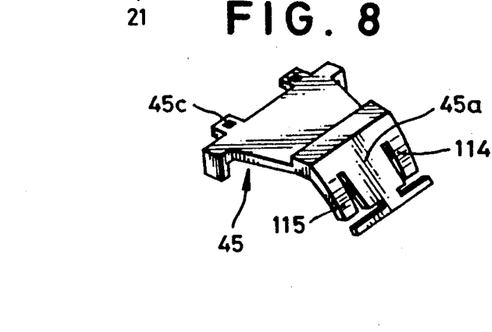
FIG. 8 is a perspective view of another mirror holddown member having slits.

Also, the mirror hold-down portion 45a for pressing the mirror 36 against the mirror frame 34a is preferably formed with two slits 114 to form a tongue 115 as shown in FIG. 8 which is slightly bent to have an elastic nature and by which the mirror 36 is preferably pressed against the mirror frame 34a. The mirror hold-down portion 45a is covered by a box-shaped shading cover 78 formed integrally on the inner wall of the rear cover 22 so that light will be prevented from entering into or exiting from the exposure chamber 33 through the slits 114, merely by mounting the rear cover 22 on the main case body 20. Therefore, the casing 11 can be easily assembled also in this embodiment.

Figure 10:
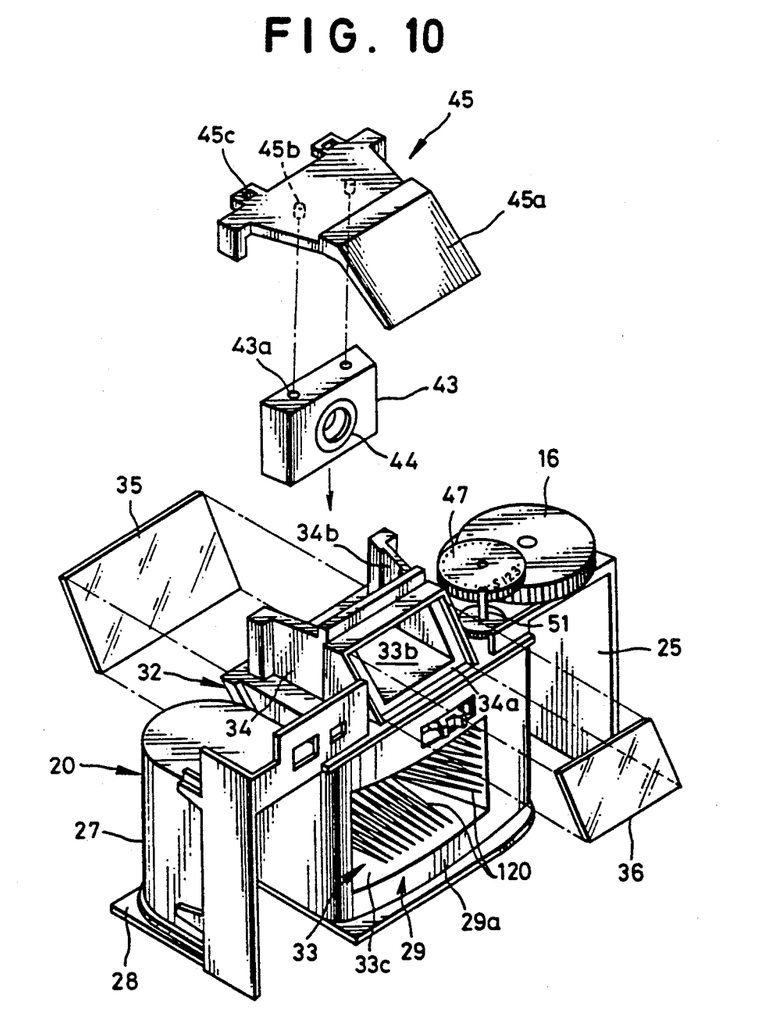
FIG. 10 is an exploded perspective view similar to FIG. 3 but showing a further embodiment of the present invention which has structure for preventing internal reflection.
Figure 11:
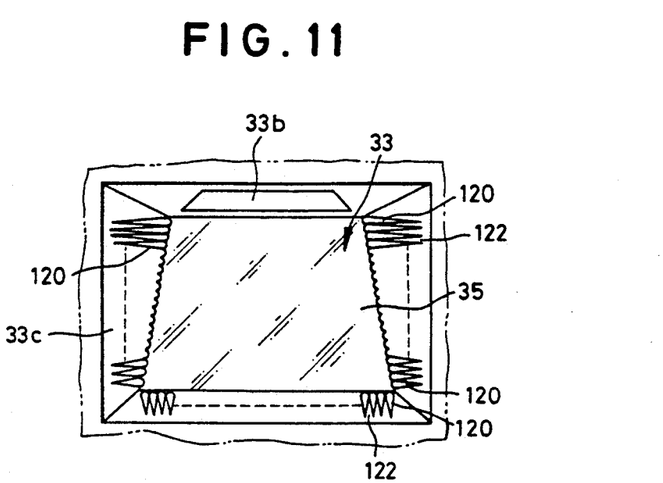
FIG. 11 is a rear view of the exposure chamber shown in FIG. 10.
Figure 12:
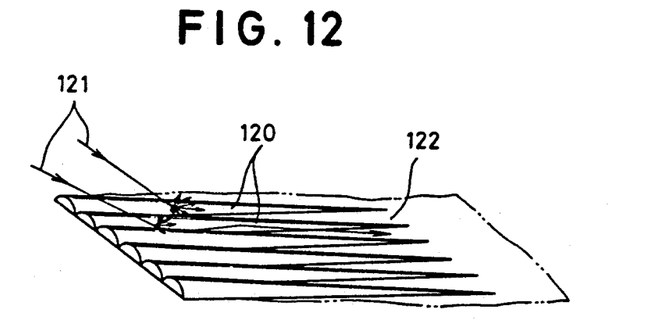
FIG. 12 is an explanatory view showing schematically the reflection of stray light in the embodiment shown in FIG. 10.

Referring now to FIGS. 10-12, there is shown still another embodiment of the present invention wherein there is provided means for preventing internal reflection in the exposure chamber 33 from causing flares. Since the angle of view is small in telephotography and the exposure chamber 33 is of minimum size in the interest of compactness, the exposure light will pass closer to the inner walls 33c of the exposure chamber 33. For this reason, it is necessary to prevent to a sufficient degree internal reflections from the inner walls 33c. This requirement is effectively met by providing a number of ridges 120 extending parallel to the optical axis on the inner walls 33c. In order not to influence the film surface, the ridges 120 should be fine in size and preferably about 0.6 mm in height. Since the stray light is irregularly reflected between two adjacent ridges 120, the light is repeatedly diffused and absorbed into the inner walls 33c. Although such ridges are not ordinarily formed on the top wall having the opening 33b, it may be possible to provide such ridges thereon if necessary.

Each ridge 120 is tapered so as to decrease in height and width toward the exposure station 30. Such structure of the ridges makes it easy to remove the main case body 20 from a mold when forming the main case body 20 integrally with the ridges 120.

Although each ridge 120 is of circular arch shape in cross section, the ridges 120 may have any other shape that can diffuse and absorb the stray light 121 (FIG. 12) such as elliptical curved surfaces or the like. The entire surface of the inner wall 33c, namely all the surfaces of the ridges 120 and spacing areas 122 are formed with a rough and matt surface by molding so as to irregularly reflect and diffuse the stray light, thereby to prevent internal reflection more effectively. In order to make it easy to remove the product from the mold, the ridges 120 are also arranged substantially parallel to each other. It is to be noted that two adjacent ridges 120 may be connected by a concave surface continuing to the surface of the ridges on both sides, in place of the planar surface 122.

Next will be described the result of a measurement for detecting the flare factor in several examples of film package having the internal reflection-preventing structure according to different embodiments of the present invention, and in comparative film packages having conventional internal reflection-preventing structures, wherein the measurement data were recorded for two samples of each type.

COMPARATIVE 1A, 1B

A conventional film package in which the inner walls of the exposure chamber have no ridges 120 but have rough surfaces.

COMPARATIVE 2A, 2B

A film package in which the inner wall has surfaces formed with a number of ridges extending transversely to the optical axis.

EXAMPLE 3A, 3B

A film package according to the present invention in which the inner wall has rough surfaces formed with a number of ridges extending parallel to the optical axis. The pitch of the ridges is 1.1 mm.

EXAMPLE 4A, 4B

A film package according to Examples 3A, 3B, but in which the pitch of the ridges is 1.2 mm.

EXAMPLE 5A, 5B

A film package according to 3A, 3B, but in which the pitch of the ridges is 1.3 mm.

EXAMPLE 6A, 6B

A film package according to 3A, 3B, but in which the pitch of the ridges is 1.8 mm.

Respective means values of flare factors measured at the center and at the four corners of frames of a negative film exposed by using the above film packages are shown in the following Table.

| SAMPLE | CENTER (mean value) | CORNERS (mean value) |
| --- | --- | --- |
| Comparative 1A (no ridge) | 3.71 | 5.95 |
| Comparative 1B (no ridge) | 3.81 | 6.30 |
| Comparative 2A (transverse ridges) | 3.99 | 3.30 |
| Comparative 2B (transverse ridges) | 3.99 | 3.30 |
| Example 3A: pitch = 1.1 | 3.31 | 3.10 |
| Example 3B: pitch = 1.1 | 3.29 | 3.13 |
| Example 4A: pitch = 1.2 | 2.93 | 1.94 |
| Example 4B: pitch = 1.2 | 2.83 | 1.91 |
| Example 5A: pitch = 1.3 | 3.60 | 3.00 |
| Example 5B: pitch = 1.3 | 3.70 | 2.90 |
| Example 6A: pitch = 1.8 | 3.90 | 3.10 |
| Example 6B: pitch = 1.8 | 3.99 | 3.13 |

As is obvious from the above table, the flare factors of the examples according to the present invention are lowered relative to any of the comparative examples 1A, 1B, 2A and 2B. But the examples having a pitch of 1.8 mm do not greatly lower the flare factor as compared with conventional internal reflection-preventing structure. Consequently, it is preferable to arrange the ridges 120 at a pitch of 1.1–1.3 mm, and more preferably at a pitch of 1.2 mm, because the flare factor can be remarkably lowered when the pitch is 1.2 mm as is shown in the Table.

Although in the above embodiment the internal reflection-preventing structure of the present invention is applied to a telephotographic film package, it may be possible to apply it to other types of film package having standard focal length or to conventional reusable cameras. Also in those cases, a plurality of ridges extending in the direction of the optical axis on the inner wall surface of the exposure chamber will effectively prevent internal reflections.

The ridges 120 are not necessarily formed over the whole surface of the inner walls 33c. The ridges may be formed on any one side of the inner wall surfaces. For example, internal reflection can be still effectively prevented when the ridges are formed on only the bottom surface of the inner walls because high brightness light from the sky entering through the taking lens will travel near the bottom surface and therefore internal reflections on the bottom surface tend to have the worst influence on the recorded image.

Although the present invention has been fully described by way of the preferred embodiments thereof with reference to the accompanying drawings, it is to be noted that various changes and modifications will be apparent to those skilled in the art. Therefore, unless otherwise such changes and modifications depart from the scope of the present invention, they should be construed as included therein.

What is claimed is:

1. A lens-fitted photographic film package having a casing previously loaded with unexposed film and a shutter for exposing the unexposed film, comprising:
    a first chamber for receiving said unexposed film;
    an exposure station for supporting a portion of film strip pulled out from said first chamber, said portion of film strip being exposed through movement of said shutter;
    a second chamber for receiving said exposed film strip from said exposure station;
    a taking lens disposed at an upper side of said casing and between said first and second chambers;
    a first mirror disposed inside said casing behind said taking lens and above said exposure station for reflecting light entering through said taking lens forwardly and downwardly in said casing;
    a second mirror disposed inside said casing below said taking lens and forward of said exposure station for reflecting light from said first mirror toward said exposure station; and
    film advancing mechanism disposed between said first mirror and said second chamber, said exposure station being positioned substantially nearer to said first chamber than to said second chamber so that said first mirror will not interfere with said film advancing mechanism.

2. A lens-fitted photographic film package as defined in claim 1, wherein said first and second mirrors are parallel to each other.

3. A lens-fitted photographic film package as defined in claim 1, wherein said first chamber contains a roll of unexposed film strip and said second chamber contains a cartridge removable from said casing, said exposed film strip being rewound into said cartridge frame by frame as said film strip is exposed.

4. A lens-fitted photographic film package as defined in claim 1, wherein said shutter comprises:
    a pivotally mounted shutter blade;
    an acceleration lever for accelerating the speed of pivoting of said shutter blade, said acceleration lever having a coupling portion for coupling to said shutter blade and being pivotally mounted on an axle;
    a spring urging said acceleration lever in a direction to close said shutter blade; and
    a drive lever engaged at one end in an engaging portion which is formed between said coupling portion and said axle of said acceleration lever, said drive lever driving said shutter blade to open through said acceleration lever.

5. A lens-fitted photographic film package as defined in claim 4, wherein said engaging portion has an opening therein having a straight edge and an arresting claw formed intermediate said straight edge and projecting into said opening, said arresting claw comprising a ratchet claw which arrests said one end of said drive lever moving in a direction to open said shutter blade for causing said acceleration lever to swing but allows said one end to ride over said claw when said drive lever moves in a direction to close said shutter blade.

6. A lens-fitted photographic film package having a taking lens and a shutter and being previously loaded with film, comprising:
   reflection means defining a Z-shaped light path for light entering through said taking lens, said reflection means having a first mirror disposed behind said taking lens and a second mirror disposed below said taking lens; and
   a mirror hold-down member for pressing said second mirror from a back side thereof, said mirror hold-down member having portions for holding said taking lens and a part of said shutter.

7. A lens-fitted photographic film package comprising a casing and a wrapping at least shape-matingly enclosing said casing, said package having a first chamber previously loaded with unexposed film strip and a second chamber into which exposed film strip is wound up, comprising:
   reflection means disposed between said first and second chambers and forming a Z-shaped exposure light path;
   a viewfinder disposed above said first chamber and extending through front and rear walls of said casing and of said wrapping; and
   a taking lens disposed beside said viewfinder for transmitting light from a subject to said Z-shaped exposure light path.

8. A lens-fitted photographic film package as defined in claim 7, wherein said viewfinder is a see-through viewfinder.

9. A shutter for a camera having a single shutter blade pivotally mounted on an axle, comprising:
   an acceleration lever for accelerating pivoting of said shutter blade, said acceleration lever having a coupling portion for coupling to said shutter blade and being pivotally mounted on an axle; and
   a drive lever engaged at one end in an engaging portion which is formed between said coupling portion and said axle of said acceleration lever, said drive lever driving said shutter blade to open in cooperation with said acceleration lever, said engaging portion comprising an arresting claw arresting said one end of said drive lever moving in a direction to open said shutter blade for causing said acceleration lever to swing but allowing said one end to ride over said claw when said drive lever moves in a direction to close said shutter blade.

10. A lens-fitted photographic film package previously loaded with a film and having a taking lens and means for exposing said film, comprising:
    a main case body in which said taking lens and exposure means are incorporated and which is loaded with said film;
    means defining a Z-shaped exposure light path in said main case body for transmitting light entering through said taking lens, said means comprising two mirrors disposed in respective corners of said Z-shaped exposure light path and fitted into said main case body;
    first and second mirror hold-down members made of thin plate to retain said mirrors in place;
    a rear cover mounted on a rear side of said main case body;
    a first shading member formed integrally with and on an inner side of said rear cover for covering said first mirror hold-down member when said rear cover is mounted on said main case body;
    a front cover mounted on said main case body; and
    a second shading member formed integrally with and on an inner side of said front cover for covering said second mirror hold-down member when said front cover is mounted on said main case body.

11. A lens-fitted photographic film package having a casing previously loaded with unexposed film and a shutter for exposing the unexposed film, comprising:
    a wrapping at least partially shape-matingly enclosing said casing;
    a first chamber for receiving said unexposed film;
    an exposure station for supporting a portion of film strip pulled out from said first chamber, said portion of film strip being exposed through movement of said shutter;
    a second chamber for receiving said exposed film strip from said exposure station;
    a taking lens disposed at an upper side of said casing and between said first and second chambers;
    a first mirror disposed inside said casing behind said taking lens and above said exposure station for reflecting light entering through said taking lens forwardly and downwardly in said casing;
    a second mirror disposed inside said casing below said taking lens and forward of said exposure station for reflecting light from said first mirror toward said exposure station; and
    a see-through viewfinder formed in said casing and extending through front and rear walls of said casing and of said wrapping and disposed above said first chamber and adjacent to said taking lens.

12. A lens-fitted photographic film package having a casing previously loaded with unexposed film and a shutter for exposing the unexposed film, comprising:
    a first chamber for receiving said unexposed film;
    an exposure station for supporting a portion of film strip pulled out from said first chamber, said portion of film strip being exposed through movement of said shutter;
    a second chamber for receiving said exposed film strip from said exposure station;
    a taking lens disposed at an upper side of said casing and between said first and second chambers;
    a first mirror disposed inside said casing behind said taking lens and above said exposure station for reflecting light entering through said taking lens forwardly and downwardly in said casing;
    a second mirror disposed inside said casing below said taking lens and forward of said exposure station for reflecting light from said first mirror toward said exposure station;
    first and second mirror frames respectively for supporting said first and second mirrors; and
    first and second mirror hold-down members respectively for pressing said first and second mirrors from back sides thereof against said first and second frames.

13. A lens-fitted photographic film package as defined in claim 12, wherein said second mirror hold-down member has portions for holding said taking lens and a part of said shutter.

14. A lens-fitted photographic film package as defined in claim 12, wherein said first and second mirror hold-down members are formed with at least one slit for providing elastic portions therein, said elastic portions pressing against the backs of said first and second mirrors respectively.

15. A lens-fitted photographic film package as defined in claim 14, further comprising two shading members for shading said first and second mirror hold-down members from ambient light.

16. A lens-fitted photographic film package having a casing previously loaded with unexposed film and a shutter for exposing the unexposed film, comprising:
   a first chamber for receiving said unexposed film;
   an exposure station for supporting a portion of film strip pulled out from said first chamber, said portion of film strip being exposed through movement of said shutter;
   a second chamber for receiving said exposed film strip from said exposure station;
   a taking lens disposed at an upper side of said casing and between said first and second chambers;
   a first mirror disposed inside said casing behind said taking lens and above said exposure station for reflecting light entering through said taking lens forwardly and downwardly in said casing;
   a second mirror disposed inside said casing below said taking lens and forward of said exposure station for reflecting light from said first mirror toward said exposure station; and
   an exposure chamber of rectangular shape is disposed between said exposure station and said second mirror, said exposure chamber having in a top wall thereof an opening through which light passes from said first mirror toward said second mirror, said exposure chamber having on at least one inner wall surface thereof a number of ridges extending in a direction parallel to a path of light reflected from said second mirror toward said exposure station for reducing internal reflection in said exposure chamber, said ridges decreasing in height and width in the direction of said exposure station.

17. A camera comprising:
   a taking lens;
   means supporting a film to receive exposure light from said taking lens;
   an exposure chamber through which said exposure light travels between said taking lens and a said film; and
   a plurality of ridges formed on an inner wall surface of said exposure chamber and extending parallel to a direction of travel of said exposure light for trapping light reaching said inner wall surface, said ridges decreasing in height and width in the direction of a said film.

18. A camera as defined in claim 17, wherein said ridges have an arcuate cross sectional configuration.

* * * * *